P. CUNTALA.
SPLINE.
APPLICATION FILED SEPT. 12, 1921.

1,435,811.

Patented Nov. 14, 1922.
2 SHEETS—SHEET 1.

Pal Cuntala.
INVENTOR

P. CUNTALA.
SPLINE.
APPLICATION FILED SEPT. 12, 1921.

1,435,811.

Patented Nov. 14, 1922.
2 SHEETS—SHEET 2.

Pal Cuntala.
INVENTOR

Patented Nov. 14, 1922.

1,435,811

UNITED STATES PATENT OFFICE.

PAL CUNTALA, OF CARTERET, NEW JERSEY.

SPLINE.

Application filed September 12, 1921. Serial No. 500,004.

*To all whom it may concern:*

Be it known that I, PAL CUNTALA, a citizen of Czecho-Slovakia, residing at Carteret, in the county of Middlesex and State of New Jersey, have invented new and useful Improvements in Splines, of which the following is a specification.

The spline, ordinarily employed for securing a pulley or like wheel on a shaft is in the nature of a wedge member that is forced in registering grooves in the shaft and in the hub of the wheel. For various reasons, it is frequently necessary to remove the wheel from the shaft, and the spline or key is subjected to the force of blows from a hammer or the like, which not infrequently inflicts injury to the spline, to the hub of the wheel, and to the shaft. The ordinary splines or keys also are liable to rust in the grooves, and consequently become so fixed in the grooves that the removal thereof requires a great amount of time and labor.

It is the object of the present invention to produce a means for splining the hub of a pulley or like wheel on a shaft, in a manner which will permit the ready removal of the spline when the wheel is to be removed from the shaft or adjusted thereon.

It is a further object to produce a spline for this purpose which comprises three separable elements, the intermediate element being in the nature of a key which spreads the outer members to force the same tightly against the walls of the grooves in which they are received, while locking means is provided for the intermediate or key member, the said locking means being of an adjustable nature, whereby the outer members may be spread away from each other at desired predetermined distances, while the wedge or key member may be readily moved from between the outer members, when the locking means is released and thus permit of the outer members being brought toward each other and consequently easily removed from the grooves.

The foregoing, and other objects which will appear as the nature of the invention is better understood, may be accomplished by a construction, combination and operative arrangement of parts, such as is disclosed by the drawings which accompany and which form part of this application.

In the drawings:—

Figure 1:
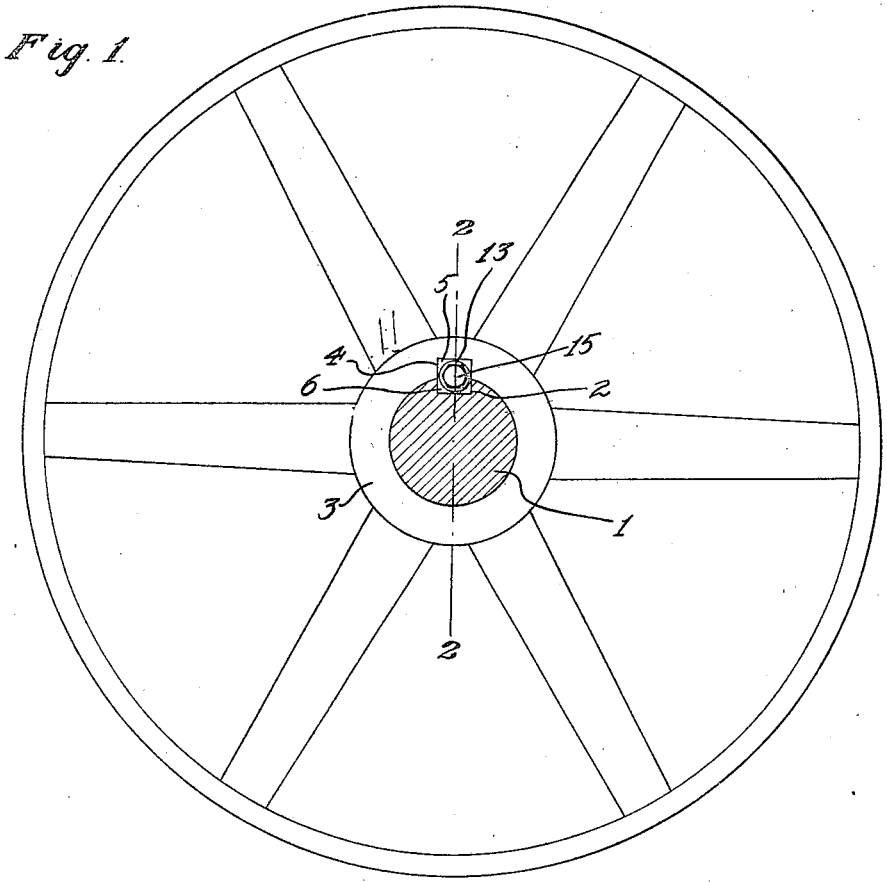
Figure 1 is a view illustrating a pulley or like wheel splined on a shaft in accordance with this invention, the shaft being in section.
Figure 4:
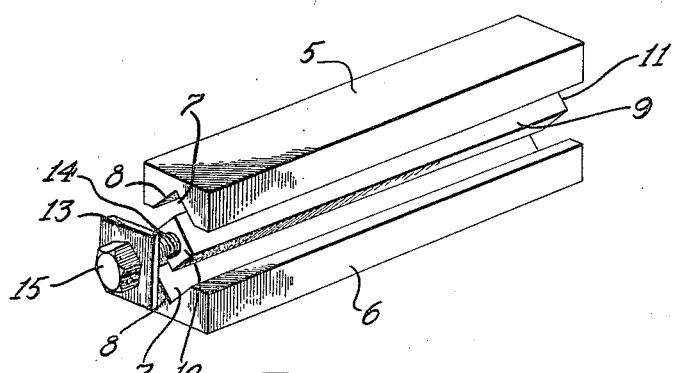
Figure 4 is a perspective view showing the elements constituting the spline separated.
Figure 2:
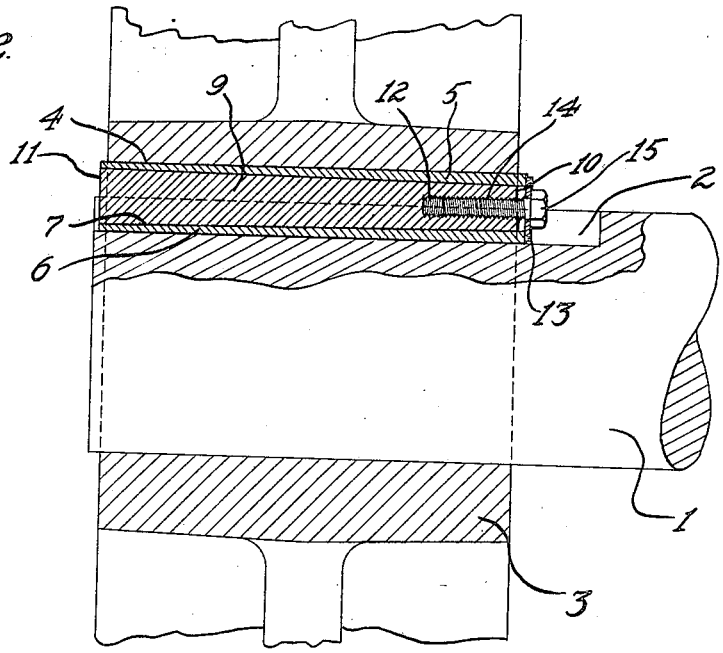
Figure 2 is a longitudinal sectional view on the line 2—2 of Figure 1.
Figure 3:
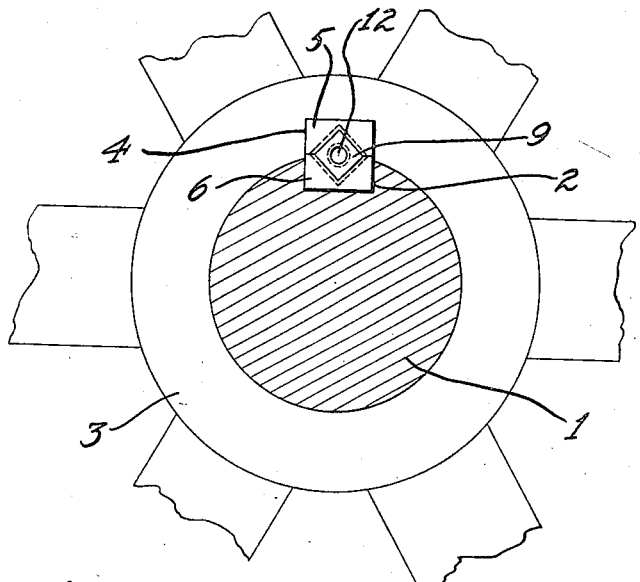
Figure 3 is a fragmentary elevation of the wheel and shaft, showing the locking element for the key of the spline removed.

Referring now to the drawings in detail, the numeral 1 designates a power shaft which is provided, in the usual manner with the longitudinally extending spline groove 2. On the power shaft 1 there is a wheel or pulley 3 that has its hub portion provided with the usual spline slot 4 that is designed to be brought opposite the slot 2.

The improved spline includes a pair of substantially similar members, which, however, are indicated for distinction by the numerals 5 and 6 respectively. These members are of a width to be snugly received in the respective grooves 2 and 4, the said members being substantially rectangular in cross section and having their inner or confronting faces provided with longitudinal channels 7, whose side walls are inclined, as at 8, to the center of the members 5 and 6.

The numeral 9 designates the key member of the device. This key member is substantially square in cross section, but gradually increases in width or thickness from what I will term its front end 10 to its rear end 11. The key, it will be noted is wedge-shaped and is arranged in the substantially V-shaped channels of the members 5 and 6 and moved longitudinally through the members, after the said members have been arranged in the grooves 2 and 4. The spline end 11 of the key may be subjected to light blows from a hammer to facilitate the movement thereof through the channels of the members 5 and 6, and the engagement of the key with the said members 5 and 6 will cause the same to be spread away from each other into tight engagement with the walls of the grooves. From the reduced end 10 of the wedge key 9 there is a centrally arranged threaded orifice 12. On the ends of the members 5 and 6 adjacent to the reduced end of the wedge key 9, I arrange a washer 13. Through the central opening in the washer there is passed the threaded shank 14 of a headed bolt 15. The shank 14 is received in the orifice 12, and the threads of the shank coengage with the threads in the orifice. The length of the shank is less than the depth of the orifice 12, so that the bolt can be screwed in the key until its head 15 contacts with the outer face of the washer 13, and further screwed to move the wedge key longitudinally in the direction of the washer, thus further spreading the members 5 and 6 and effectively sustaining the same in the grooves 2 and 4.

When it is desired to remove the spline, the bolt and washer are first removed. A suitable tool is inserted in the V channels of the members 5 and 6 and is brought into contact with the reduced end 10 of the key 9. This implement is then subjected to force of contact from blows of a hammer, and the key is thus moved longitudinally in an outward direction through the members 5 and 6. Upon the removal of the keys the members 5 and 6 may be likewise readily removed from the grooves 2 and 4. It should be stated that the members 5 and 6 are preferably constructed of brass or copper so that cohesion between the steel shaft and the iron or steel hub of the wheel or pulley 3 will take place. In a like manner the wedge key 9 is constructed of steel so that cohesion between the wedge key and the members 5 and 6 will not occur, and consequently the wedge key can be removed from between the members 5 and 6 in a comparatively easy manner.

It is thought that the foregoing description, when taken in connection with the drawings will clearly set forth the construction and advantages of the improvement, but it is thought necessary to state that while the drawings illustrate a satisfactory embodiment of the improvement as it now appears to me, such changes may be made therefrom as fall within the scope of what is claimed.

Having described the invention, I claim:—

In a means for splining a wheel on a shaft in which both the wheel and shaft have registering splined grooves, comprising members received in the respective grooves, said members having their confronting faces formed with V-shaped channels throughout the length thereof, a cross sectionally squared key which is gradually increased in length and thickness from one to the opposite ends thereof received in the channels and contacting with the walls thereof, said key having its reduced end provided with a threaded orifice, a washer on the members adjacent the reduced end of the key, and a bolt passing through the washer and entering the threaded orifice in the bolt for holding the central wedge member against longitudinal movement between the outer members and for further adjusting the wedge member longitudinally between the outer members.

In testimony whereof I affix my signature.

PAL CUNTALA.